United States Patent
Li et al.

(10) Patent No.: US 7,137,249 B2
(45) Date of Patent: Nov. 21, 2006

(54) THERMALLY STABLE LEAN NOX TRAP

(75) Inventors: John Li, Canton, MI (US); William Watkins, Toledo, OH (US); Christian Goralski, Jr., St. Paul, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 10/710,922

(22) Filed: Aug. 12, 2004

(65) Prior Publication Data

US 2006/0032214 A1    Feb. 16, 2006

(51) Int. Cl.
*F01N 3/10* (2006.01)

(52) U.S. Cl. .............. 60/301; 60/274; 60/285; 60/297; 423/213.2; 423/213.5; 422/171; 422/177; 502/252; 502/261; 502/324; 502/325

(58) Field of Classification Search .......... 60/274, 60/285, 297, 299, 300, 301; 423/213.2, 213.5, 423/213.7; 422/170, 171, 177, 180; 502/241, 502/243, 252, 261, 262, 324, 325, 328, 330, 502/332, 334, 339
See application file for complete search history.

(56) References Cited

U.S. PATENT DOCUMENTS

| | | |
|---|---|---|
| 4,001,371 A | 1/1977 | Remeika et al. |
| 4,049,583 A | 9/1977 | Lauder |
| 4,077,913 A | 3/1978 | Acres et al. |
| 4,127,510 A | 11/1978 | Harrison et al. |
| 4,162,235 A | 7/1979 | Acres et al. |
| 4,956,330 A | 9/1990 | Elliott et al. |
| 5,435,981 A | 7/1995 | Ichiki et al. |
| 5,449,504 A | 9/1995 | Kasahara et al. |
| 5,597,771 A | 1/1997 | Hu et al. |
| 5,635,142 A | 6/1997 | Ichiki et al. |
| 5,747,410 A | 5/1998 | Muramatsu et al. |
| 5,756,057 A | 5/1998 | Tsuchitani et al. |

(Continued)

FOREIGN PATENT DOCUMENTS

EP    0 625 633 B1    11/1994

(Continued)

OTHER PUBLICATIONS

"Solid State Aspects of Oxidation Catalysis", Paul J. Gellings, Henny J.M. Bouwmeester, Catalysis Today 58 (2000), pp. 1-53.

*Primary Examiner*—Binh Q. Tran
(74) *Attorney, Agent, or Firm*—Brooks Kushman P.C.; Damian Porcari

(57) ABSTRACT

The present invention provides a method of removing harmful gases from an automobile exhaust. The method of the invention comprises contacting a thermally stable $NO_x$ trap composition with a first exhaust gas mixture at a temperature of at least 200° C. The first exhaust gas mixture includes exhaust gases from an internal combustion engine operating in a fuel-lean condition. After, $NO_x$ has been absorbed onto the $NO_x$ absorber material, the $NO_x$ trap composition is then contacted with a second exhaust gas composition. In this step, the second exhaust gas mixture includes exhaust gases from an internal combustion engine operating in a fuel-rich condition. The present invention also provides the $NO_x$ trap composition used in the method. The $NO_x$ trap of the invention includes a precious metal, a $NO_x$ absorber material, an oxide that inhibits the decrease in $NO_x$ storing ability of the $NO_x$ trap composition, and a support material.

20 Claims, 3 Drawing Sheets

U.S. PATENT DOCUMENTS

| | | | |
|---|---|---|---|
| 5,837,212 | A | 11/1998 | Hepburn et al. |
| 5,879,645 | A | 3/1999 | Park et al. |
| 5,972,821 | A | 10/1999 | Nojima et al. |
| 5,989,507 | A | 11/1999 | Sung et al. |
| 5,992,142 | A * | 11/1999 | Pott ............... 60/274 |
| 6,003,303 | A | 12/1999 | Peter-Hoblyn et al. |
| 6,087,298 | A | 7/2000 | Sung et al. |
| 6,174,835 | B1 | 1/2001 | Naito et al. |
| 6,391,822 | B1 * | 5/2002 | Dou et al. ............ 502/325 |
| 6,419,890 | B1 | 7/2002 | Li |
| 6,477,834 | B1 | 11/2002 | Asanuma et al. |
| 6,497,848 | B1 * | 12/2002 | Deeba et al. ............ 422/180 |
| 6,531,425 | B1 | 3/2003 | Golden |
| 6,555,492 | B1 | 4/2003 | Faber et al. |
| 6,620,762 | B1 | 9/2003 | Tan et al. |
| 6,699,448 | B1 | 3/2004 | Wu et al. |
| 6,777,370 | B1 * | 8/2004 | Chen ............... 502/241 |
| 6,852,666 | B1 * | 2/2005 | Bouly et al. ............ 502/304 |
| 6,923,945 | B1 * | 8/2005 | Chen ............... 423/239.1 |
| 2002/0076373 | A1 | 6/2002 | Molinier et al. |
| 2002/0103078 | A1 | 8/2002 | Hu et al. |
| 2002/0155040 | A1 | 10/2002 | Sakanushi et al. |
| 2003/0021745 | A1 | 1/2003 | Chen |
| 2003/0103886 | A1 | 6/2003 | Dou |
| 2003/0106306 | A1 | 6/2003 | Nakatani et al. |
| 2003/0147796 | A1 | 8/2003 | Suga et al. |
| 2003/0154713 | A1 | 8/2003 | Hiratsuka et al. |
| 2003/0172646 | A1 | 9/2003 | Hiratsuka et al. |
| 2003/0175192 | A1 | 9/2003 | Hu et al. |
| 2003/0181324 | A1 | 9/2003 | Hotta et al. |
| 2003/0198582 | A1 | 10/2003 | Golden |
| 2004/0043343 | A1 | 3/2004 | Kamijo |

FOREIGN PATENT DOCUMENTS

| | | |
|---|---|---|
| EP | 1 241 329 A2 | 9/2002 |
| EP | 1 302 647 A2 | 4/2003 |
| EP | 1 318 282 A1 | 6/2003 |
| EP | 0 982 487 B1 | 7/2003 |
| EP | 1 413 718 A1 | 4/2004 |
| JP | 2001-9271 A2 | 1/2001 |
| WO | WO 00/50168 | 8/2000 |
| WO | WO 01/09271 A1 | 2/2001 |
| WO | WO 02/09852 A2 | 2/2002 |
| WO | WO 02/058825 A2 | 8/2002 |
| WO | WO 02/083301 A2 | 10/2002 |
| WO | WO 03/008095 A2 | 1/2003 |
| WO | WO 03/040259 A2 | 5/2003 |

* cited by examiner

THERMALLY STABLE LEAN NOX TRAP

BACKGROUND OF INVENTION

1. Field of the Invention

The present invention relates to lean $NO_x$ traps with improved aging characteristics, and in particular, to lean $NO_x$ traps that resist degradation of NO storage capacity upon thermal aging.

2. Background Art

Environmental concerns and governmental regulations have been a continuing impetus for improvements in pollution control from automotive vehicles. The treatment or removal of noxious combustion by-products from the exhausts of such vehicles is a major focus of such efforts. Typically these combustion by-products include incomplete combustion by-products such as carbon monoxide and hydrocarbons. Moreover, the exhausts of these vehicles also include various nitrogen oxides and sulfur oxides. It is desirable and mandated that each of these compounds be reduced to a level that meets certain governmental regulations during vehicle operation.

Lean engines operate under fuel-lean conditions, i.e., a net oxidizing condition. Such an exhaust environment poses unique requirements for treating carbon monoxide, hydrocarbons, and especially $NO_x$. $NO_x$ is the most difficult to convert because the exhaust gas is oxidizing yet $NO_x$ needs to be reduced in order to convert it to $N_2$. One of the most promising treatments of $NO_x$ from lean-burn operation today involves the use of nitrogen oxide absorbent material with precious metals or lean $NO_x$ traps. Such $NO_x$ trap materials are able to absorb nitrogen oxides during lean-burn operation and to release them when the oxygen concentration in the exhaust gas is lowered. Accordingly, these traps are used with engine systems that operate primarily in a lean air/fuel ratio. However, when it is desired to purge the traps of $NO_x$, the exhaust entering the trap is made fuel richer—either stoichiometric or fuel rich of stoichiometric.

One of the most critical problems for wide application of lean $NO_x$ traps ("LNT") is the thermal stability/durability of the trap. Typically a well made LNT will store and convert $NO_x$ to $N_2$ with high efficiency (>90%) when the trap has not been exposed to high temperature (e.g. >750° C.) aging. However, when the trap is aged at high temperature, the trap degradates quickly, losing the high efficiency of storing and converting $NO_x$. In practice, such a high temperature can be expected in the exhaust system where a trap is located, in cases such as high speed/load operation, engine misfire, lean $NO_x$ trap desulfation, etc. This relatively poor thermal stability and or durability has hindered the wide application of the LNT trap, or the lean burn engines.

Our studies show that an important mechanism for deactivation of lean $NO_x$ traps after high temperature aging is the loss of storage efficiency. And the critical modes for the loss of storage efficiency are the loss of oxidation activity of NO to $NO_2$, and the loss of proximity between the precious metal and the trapping element after thermal aging, thereby limiting the spillover of oxygen atoms from the precious metal to the trapping element to convert the (barium) nitrite to (barium) nitrate, or the $NO_x$ species from the precious metal to the trapping element to form nitrates.

Accordingly, there exists a need for lean $NO_x$ traps with improved storage efficiency and in particular with improved oxidation activity and proximity of the active components after high temperature aging.

SUMMARY OF INVENTION

The present invention overcomes one or more problems of the prior art by providing in one embodiment a method of removing harmful gases from an automobile exhaust. The method of the invention comprises contacting a $NO_x$ trap composition with a first exhaust gas mixture at a temperature of at least 200° C. The first exhaust gas mixture includes exhaust gases from an internal combustion engine operating in a fuel-lean condition. The method of the invention is specifically characterized by the $NO_x$ trap composition which includes a precious metal, a $NO_x$ absorber material, an oxide that inhibits the decrease in $NO_x$ storing ability of the $NO_x$ trap composition, and a support material. After $NO_x$ has been absorbed onto the $NO_x$ absorber material, the $NO_x$ trap composition is then contacted with a second exhaust gas composition at a temperature of at least 200° C. In this step, the second exhaust gas mixture includes exhaust gases from an internal combustion engine operating in a fuel-rich condition. A particularly important aspect of the invention is the oxidation and spillover promoting function of the oxide that inhibits the decrease in $NO_x$ storing ability of the $NO_x$ trap composition. For example, the incorporation of Mn and Mg into a $NO_x$ trap formulation (with Pt, Ba on Al) significantly improves thermal durability and in particular, the addition of Mn improves the oxidation activity significantly, especially after the LNT is aged. It is also believed that the addition of Mg lowers the defect energy at the Ba—Mg boundary, resulting in more defect formations for Ba, thereby promoting the spill over effect at the grain boundaries of these defects.

In another embodiment of the invention, a lean $NO_x$ trap executing the method of the invention is provided. The composition of the $NO_x$ trap of this embodiment is the same as that set forth above. Specifically, the $NO_x$ trap includes a sufficient amount of an oxide to inhibit a decrease in $NO_x$ storing ability when the $NO_x$ trap composition is thermally aged.

In yet another embodiment of the invention, an automobile exhaust system which implements the method of the invention by incorporating the $NO_x$ trap of the invention is provided.

BRIEF DESCRIPTION OF DRAWINGS

FIG. 2D is a plot comparing the oxidation activity of aged (900° C., 12 hr, 6% enriched air aging) test sample prepared from sample catalyst D;

DETAILED DESCRIPTION

Figure 1A:
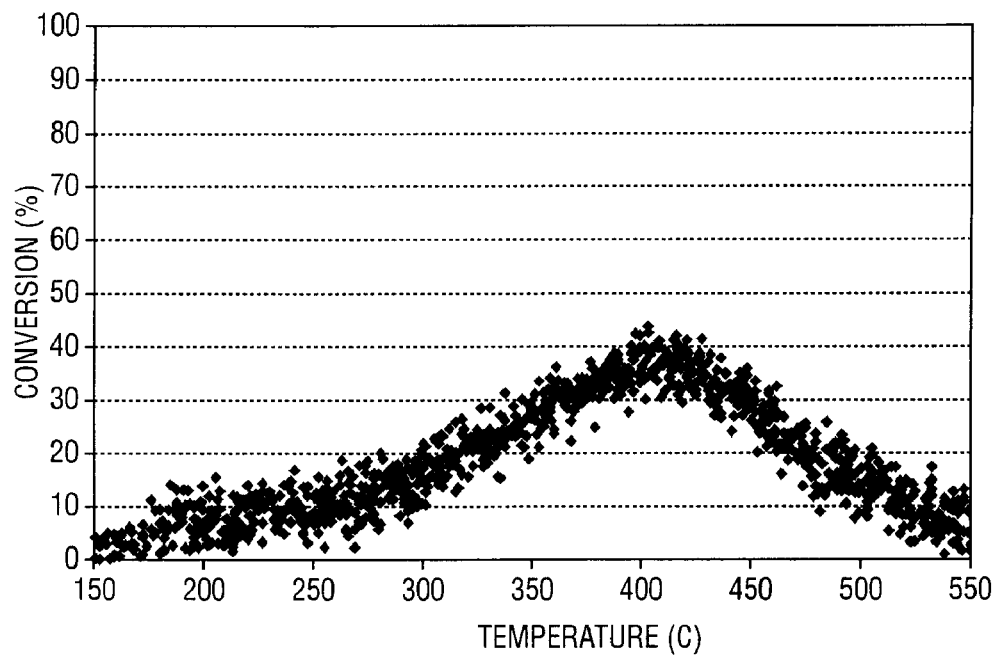
FIG. 1A is a plot of the oxidation activity (determined from the conversion of NO to $NO_2$) of an unaged commercially available $NO_x$ trap composition.

The following examples illustrate the various embodiments of the present invention. Those skilled in the art will recognize many variations that are within the spirit of the present invention and scope of the claims.

In an embodiment of the present invention, a method of removing harmful gases from an automobile exhaust is provided. Such automobile exhausts include $NO_x$, CO, and hydrocarbons. The method of the invention comprises contacting a $NO_x$ trap composition with a first exhaust gas mixture at a temperature of at least 200° C. The first exhaust gas mixture includes exhaust gases from an internal combustion engine operating in a fuel-lean condition (i.e., oxygen rich). Moreover, the $NO_x$ trap composition used in the method includes a precious metal, a $NO_x$ absorber material, an oxide that inhibits the decrease in $NO_x$ storing ability of the $NO_x$ trap composition, and a support material. After, $NO_x$ has been absorbed onto the $NO_x$ absorber material, the $NO_x$ trap composition is then regenerated by contact with a second exhaust gas composition at a temperature of at least 200° C. In this step, the second exhaust gas mixture includes exhaust gases from an internal combustion engine operating in a fuel-rich condition.

In another embodiment of the invention, a thermally stable $NO_x$ trap composition is provided. The thermally stable $NO_x$ trap composition is the same composition used in the methods of the invention set forth above. Moreover, the $NO_x$ trap composition of this embodiment is advantageously included in a vehicle exhaust system for removing $NO_x$ from the exhaust of an internal combustion engine. The $NO_x$ trap composition is further characterized in that a $NO_x$ trap incorporating the $NO_x$ trap composition has a $NO_x$ storage efficiency of at least 5% at a temperature of 400° C. after aging of the $NO_x$ trap at 900° C. for 12 hr under 6% (volumetric percent) oxygen enriched air. In a variation of the invention, a $NO_x$ trap incorporating the $NO_x$ trap composition has a $NO_x$ storage efficiency of at least 20% at a temperature of 400° C. after aging of the $NO_x$ trap at 900° C. for 12 hr under 6% (volumetric percent) oxygen enriched air. In another variation of the invention, a $NO_x$ trap incorporating the $NO_x$ trap composition has a $NO_x$ storage efficiency of at least 30% at a temperature of 400° C. after aging of the $NO_x$ trap at 900° C. for 12 hr under 6% (volumetric percent) oxygen enriched air.

The oxide which is included in the $NO_x$ trap composition used in the method of the invention is characterized as conveying improved thermal stability onto the $NO_x$ trap. The oxide inhibits the decrease in $NO_x$ storing ability of the $NO_x$ trap composition. Specifically, a $NO_x$ trap with this oxide will have less of a drop in $NO_x$ storing ability than a similar trap not having such an oxide. Suitable oxides for inhibiting the decrease in $NO_x$ storing ability of the $NO_x$ trap composition include, for example, oxides selected from the group consisting of oxides of magnesium, oxides of manganese, and combinations thereof. In accomplishing the goal of improving thermal stability, the amounts of the oxide in the $NO_x$ trap composition require special attention. If the amount of oxide is too low (less than 1% of the $NO_x$ trap washcoat) the improvement in stability is insignificant. As used herein, "washcoat" refers to coatings of the $NO_x$ trap compositions applied to a substrate by washcoating. In the washcoating process, an aqueous solution contain precursors to the components of the $NO_x$ trap are applied to the substrate and subsequently heated and calcined (see the description below). If the amount of the oxide is too high (great than 30% of the $NO_x$ trap washcoat), the $NO_x$ storage capacity is adversely affected. Presumably, this adverse effect is the result of the oxide replacing too many sites which should be occupied by the $NO_x$ absorber (i.e., the barium oxide). Therefore, in some variations of the invention, the oxide is present in an amount from about 1 to 30% of the total weight of the $NO_x$ trap washcoat. In other variations of the invention, the oxide is present in an amount from about 5 to 20% of the total weight of the $NO_x$ trap washcoat. In still other variations of the invention, the oxide is present in an amount from about 5 to 15% of the total weight of the $NO_x$ trap washcoat.

The $NO_x$ trap composition used in the method of the invention also includes a $NO_x$ absorber and a precious metal. Typically, the $NO_x$ absorbers are basic oxides. Suitable basic oxides are selected from the group consisting of oxides of alkali metals, oxides of alkaline earth metals, oxides of rare earth metals, and combinations thereof. In a variation of the invention, the $NO_x$ absorber is selected from the group consisting of cesium oxide, praseodymium oxide, strontium oxide, barium oxide, and combinations thereof. In one variations of the invention, the $NO_x$ absorber is present in an amount from about 5 to 50% of the total weight of the $NO_x$ trap washcoat. In another variation, the $NO_x$ absorber is present in an amount from about 5 to 40% of the total weight of the $NO_x$ trap washcoat. In still other variations, the $NO_x$ absorber is present in an amount from about 10 to 25% of the total weight of the $NO_x$ trap washcoat. The precious metal used in the $NO_x$ trap and method of the invention is typically a metal selected from the group consisting of platinum, palladium, rhodium, and combinations thereof. In one variations of the invention, the precious metal is present in an amount from about 0.1 to 10% of the total weight of the $NO_x$ trap washcoat. In another variation, the precious metal is present in an amount from about 0.5 to 5% of the total weight of the $NO_x$ trap washcoat. In still other variations, the precious metal is present in an amount from about 0.5 to 3% of the total weight of the $NO_x$ trap washcoat.

Any number of materials known to one skilled in the art may be used for the support material. The function of the support material is to provide a medium upon which to disperse the precious metal, the $NO_x$ absorber, and the oxide and to provide increased surface area for the $NO_x$ trap composition. Suitable support materials include, for example, powdered alumina.

The $NO_x$ trap composition of the invention is fabricated by impregnating support material with the $NO_x$ absorber and the precious metals. The support material is washcoated onto a monolithic substrate (such as cordierite) having from about 400 to 900 cells/$ft^2$. In such a washcoating process, an aqueous solution containing nitrate salts corresponding to the metals in the compositions set forth above are deposited onto the substrate to form a precoated substrate. Next, the precoated substrate is dried (typically at room temperature). Optionally, the precoated substrate is further dried at a temperature from about 80° C. to about 105° C. Finally, the precoated substrate is calcined at a temperature from about 600° C. to 650° C. The substrates onto which the $NO_x$ trap composition may be coated are any substrates suitable for automobile exhaust applications. Often these substrates are monolithic metallic or ceramic honeycombed structures having numerous small channels. An example of a particularly useful substrate material is cordierite. In a variation of the preparation of the $NO_x$ trap composition of the invention, the component are combined such that the Precious metal is added first in a manner such that the oxide will be in close proximity to the Precious metal. The Precious metal and stabilizing oxide are then individually calcined together to optimize the proximity between the oxidizing components (NO to $NO_2$) and trapping components. If these components are either too close or too far apart, a lower oxidation activity or a trapping efficiency is obtained. Similarly, it is desirable to have the $NO_x$ absorber material (i.e., Ba) and the stabilizing oxide (e.g., Mg) close to each other so that the boundary effects (of Mg) promote defects density and hence maximize spillover. "Spillover" as used herein refers to the transfer of oxygen atoms from the precious metal to the trapping element to convert the (barium) nitrite to (barium) nitrate or the transfer of $NO_x$ species from the precious metal to the trapping element.

In a particularly useful embodiment of the invention, a method of removing harmful gases from an automobile exhaust containing $NO_x$, CO, and hydrocarbons is provided. The method of this embodiment comprises contacting a $NO_x$ trap composition with a first exhaust gas mixture at a temperature of at least 200° C., the first exhaust gas mixture comprising exhaust gases from an internal combustion engine operating in a fuel-lean condition (for example, an air-fuel ratio of about 40). The $NO_x$ trap composition of this embodiment comprises a precious metal, barium oxide, a stabilizing oxide that inhibits the decrease in $NO_x$ storing ability of the barium oxide, and a support material. The specifics of the selection of and the amounts of the precious metal, the stabilizing oxide, and the support material are the same as those set forth above. After the contacting of the $NO_x$ trap under lean conditions for about 60 seconds, the $NO_x$ trap is then cycled through a regeneration step. Regeneration is achieved by contacting the $NO_x$ trap composition with a second exhaust gas composition. This second exhaust gas composition is different than the first exhaust gas composition and includes exhaust gases from an internal combustion engine operating in a fuel-rich condition. It should be noted that the stoichiometric air fuel ratio for gasoline operated vehicles is about 14.6. Therefore a fuel-lean condition has an air/fuel ratio greater than 14.6 and a fuel-rich condition has an air/fuel ratio less then 14.6.

The following examples illustrate the various embodiments of the present invention. Those skilled in the art will recognize many variations that are within the spirit of the present invention and scope of the claims.

With reference to Table 1, catalyst samples A–D are prepared. The following preparation of a powder sample containing Mn and Mg is representative of the preparation of catalyst samples A–D. About 20 g Degussa fumed $Al_2O_3$ was suspended in 250 ml of D.I. water at 70° C. and stirred for 2 hr. Next 2% Pt (0.408 g Pt) metal from a soluble chloride salt is added. Stirring is continued until the suspension is nearly dry, at which time an additional 150 ml of D.I water is added. Stirring is allowed to continue until the suspension becomes nearly dried and then oven dried at 80° C. in air for 6 hr. The material is then calcined at 600° C. in air for 6 hr in air with 6% excess $O_2$. Next, the sample is milled with 100 ml. D.I. $H_2O$ and enough Mn from $Mn(NO_3)_2$ to yield a deposition of 10% $Mn_2O_4$ based on $Al_2O_3$ present. The required amount is about 2.53 g $Mn(NO_3)_2$. After wet milling for 15 hr and inspection, the material is stirred until nearly dried and then oven dried for 6 hr at 80° C. in air. The sample is then calcined for 6 hr at 600° C. in air with 6% excess oxygen. A combination of 9% Mg from $Mg(NO_3)_2$ (7.28 g.) and 9% Ba from $Ba(C_2H_3O_2)_2$ (3.68 g.) is added to the sample in a single step to 100 ml water and wet milled for 20 hr. Next, the sample is stirred at 70° C. until nearly dry and then oven dried for 6 hr at 80° C. in air. Finally, the sample is calcined for 6 hr at 600° C. in air with 6% excess oxygen.

TABLE 1

Sample compositions

| Catalyst sample | Composition |
|---|---|
| A | 2% Pt, 20% BaO on alumina |
| B | catalyst sample A + 6% Mn |
| C | 2% Pt, 10% BaO, and 10% MgO on alumina |
| D | 2% Pt, 10% BaO, 10% MgO, and 6% Mn on alumina |
| E | proprietary composition from a commercially available monolith |

Catalyst sample E is prepared from a commercially available proprietary monolith (a $NO_x$ trapping monolith) which is known to have superior performance. Although there are a number of differences (e.g. trapping elements, washcoat loading, preparation engineering, etc.) between the commercially available proprietary monolith and sample A–D, the precious metal loading for each of the samples are kept close. The commercially available proprietary monolith has about 0.53% Pt and 0.05% of Rh for a total of 0.58% (Pt+Rh on total weight base). Samples A–D have about 2% Pt (nominally, washcoat basis, no Rh), the total washcoat loading is 27.3%. Hence, the Pt loading is 0.55% Pt (total weight basis).

Figure 3:
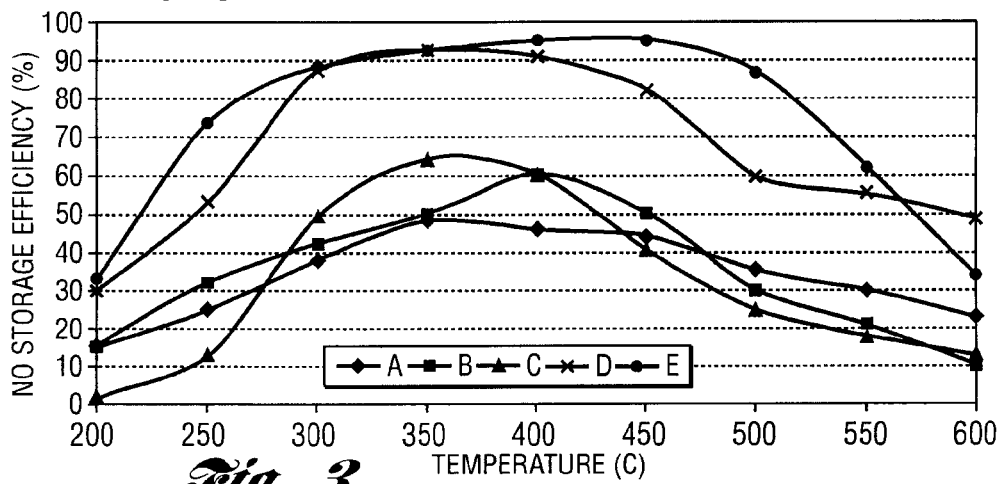
FIG. 3 provides a series of plots comparing the NO storage capacity of test samples prepared from sample catalysts A–E before aging.
Figure 4:
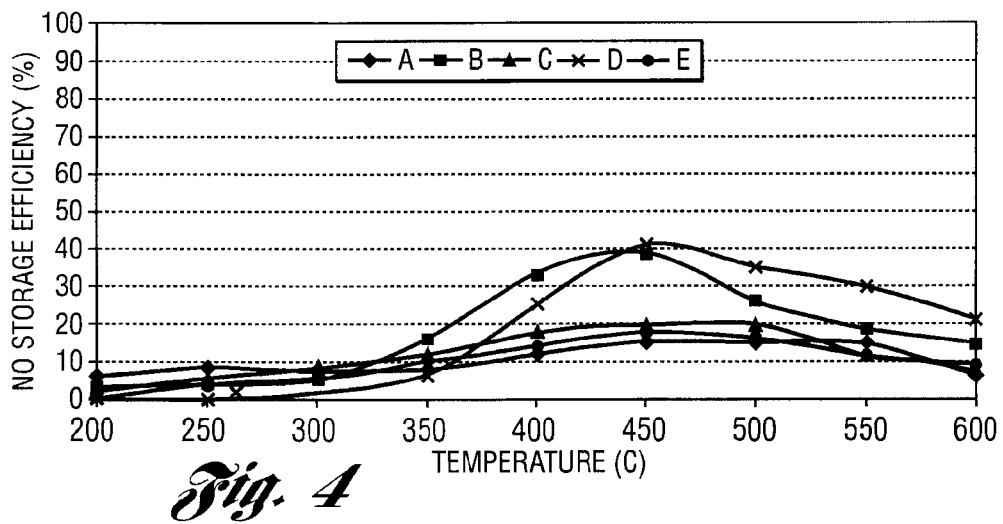
FIG. 4 provides a series of plots comparing the NO storage capacity of test samples prepared from sample catalysts A–E after aging.

For each of the experimental results illustrated in FIGS. 2–4, a test sample is prepared by combining 100 mg of powder catalyst samples A–D with 200 mg blank cordierite in the same particle sizes (40–60 mesh). This is to mimic the typical catalyst washcoat composition (30% washcoat) and to minimize temperature variation during the reaction. Preparation of a test sample from catalyst sample E is different from catalyst samples A–D. The monolith is crushed to 40–60 mesh size but not mixed with blank cordierite. In each experiment, the samples are exposed to a feed gas with a total flow rate of about 750 ml/min. This would amount to an equivalent space velocity at approximately 80 k $hr^{-1}$. The feed gas contains 500 ppm NO, 10% $CO_2$, 10% $H_2O$, with $N_2$ balance. Percentages of gaseous components as used herein are volume percentages unless otherwise stated. In addition to the components set forth above, the feed gas contains additional components depending on the particular experiment being performed (i.e., oxidation activity or NO storage efficiency determination.) For the oxidation activity experiments, the feed gas is in a lean condition having about 6% $O_2$. Oxidation efficiency means the volumetric percent of NO fed to the $NO_x$ trap which is converted to $NO_2$. For the NO storage capacity determinations, the samples go through a lean/rich cycle mode, with 60 second lean and 20 second rich. The efficiency is calculated from an average of 3 lean periods at the stated temperature. The composition of the feed gas during the lean condition is the same as set forth above while the composition of the feed gas during the rich condition further includes 4% CO and 1.3% $H_2$ (zero $O_2$). The feed-gas does not contain hydrocarbons or sulfur during these reactions unless specified. Each of the samples are pretreated prior to the oxidation activity and NO storage capacity experiments in the following manner. The samples are heated to 600° C. at 10° C./min under rich feed (no $CO_2$) and stayed at 600° C. for 20 min. Then the powder is saturated with $NO_x$ and $O_2$ at 600° C. for 10 min, ramping down (oxidation) to 100° C. at 10° C./min with $CO_2$, $H_2O$, NO, $O_2$, $N_2$ as described above.

Figure 1B:
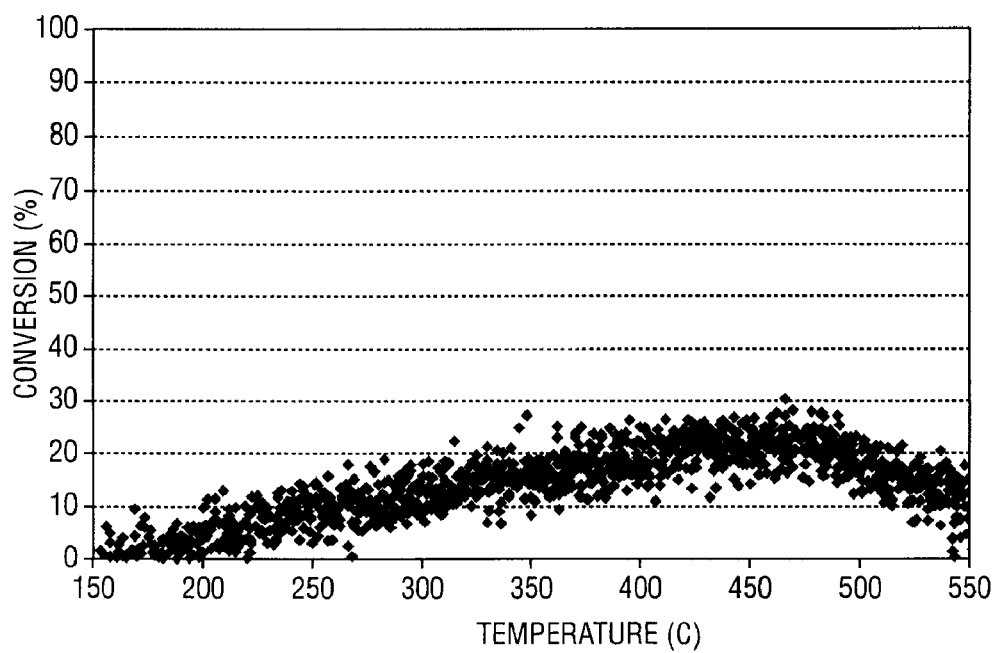
FIG. 1B is a plot of the oxidation activity (determined from the conversion of NO to $NO_2$) of an aged (at 850° C., for 50 hr in an oxidizing environment) commercially available $NO_x$ trap composition.
Figure 2A:
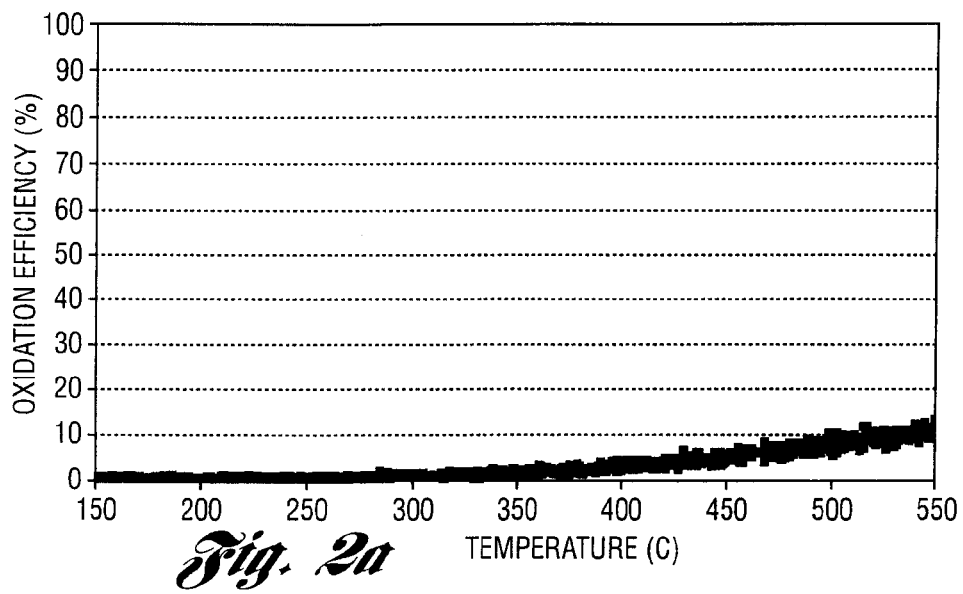
FIG. 2A is a plot comparing the oxidation activity of aged (900° C., 12 hr, 6% enriched air aging) test sample prepared from sample catalyst A.
Figure 2B:
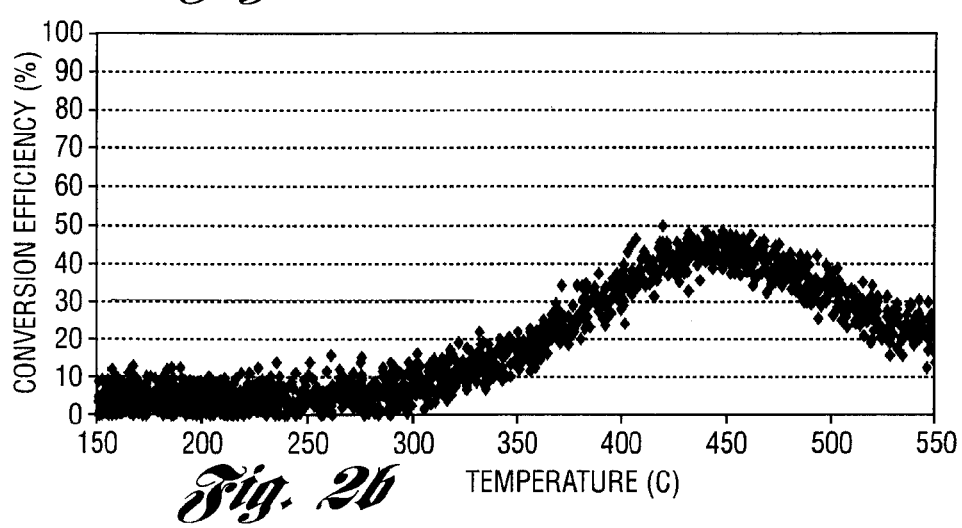
FIG. 2B is a plot comparing the oxidation activity of aged (900° C., 12 hr, 6% enriched air aging) test sample prepared from sample catalyst B.
Figure 2C:
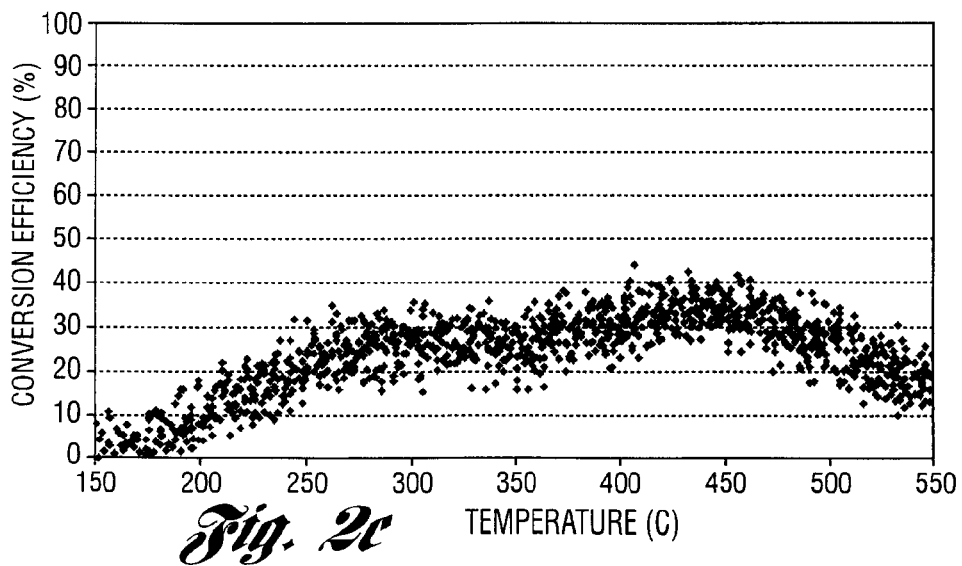
FIG. 2C is a plot comparing the oxidation activity of aged (900° C., 12 hr, 6% enriched air aging) test sample prepared from sample catalyst C.
Figure 2B:
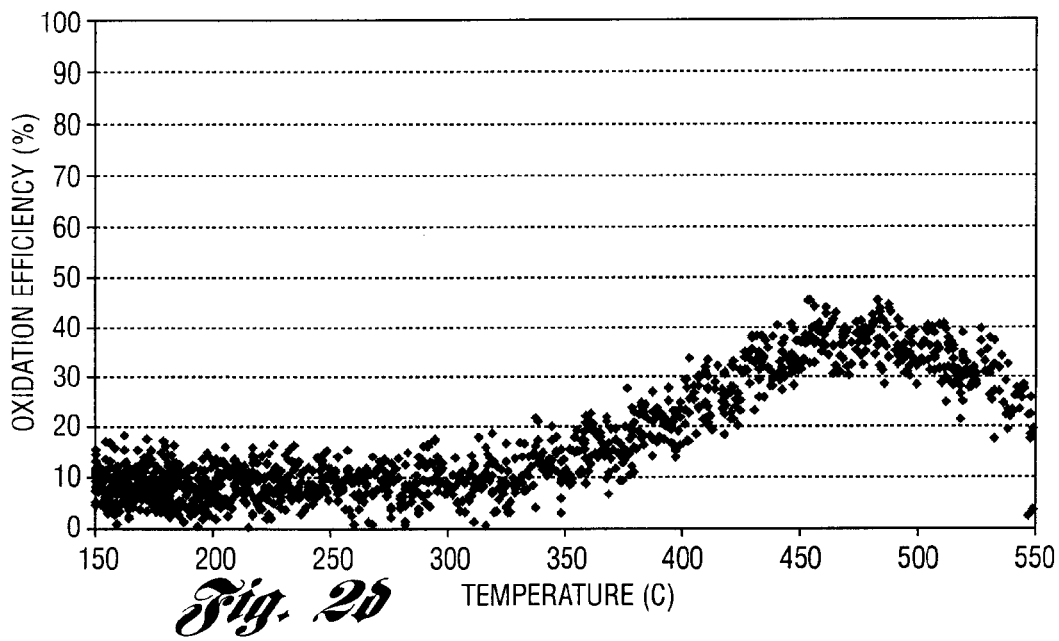

FIG. 1 shows the oxidation efficiency as a function of temperature of a commercially available monolith before and after thermal aging. These plots clearly demonstrate significant loss of oxidation activity in the temperature range from about 150° C. to about 550° C. FIGS. 2A–D provides a series of plots comparing the oxidation activity of aged (900° C., 12 hr, 6% enriched air aging) test samples prepared from catalyst samples A–D. The test sample prepared from test sample A which has 2% Pt, 20% BaO on Alumina but no stabilizing oxide exhibited a relatively low oxidation efficiency of less than 10% over the entire temperature range from about 150° C. to about 550° C. Each of the test samples prepared from catalyst samples B–D which have one or more oxides showed greater than 15% oxidation efficiency over at least a portion of the temperature range studied. The test sample prepared from catalyst sample B (catalyst sample A+6% Mn) exhibited greater than 15% oxidation efficiency in the temperature range from about 350° C. to about 550° C., and a greater than 30% in the temperature range from about 400° C. to about 500° C. The test sample prepared from catalyst sample C (2% Pt, 10% BaO, and 10% MgO on alumina) exhibits significantly higher oxidation efficiency (>20%) than catalyst sample A over the entire temperature range form about 250° C. to about 500° C. Finally, the test sample prepared from catalyst sample D (2% Pt, 10% BaO, 10% MgO, and 6% Mn on alumina) showed significant enhancement of the oxidation efficiency (72%) from about 400° C. to about 550° C.

FIG. 3 provides a series of plots comparing the NO storage efficiency of test samples prepared from sample catalysts A–E before aging. In these experiments, a proprietary monolith and sample showed the greatest storage efficiency with values of over 70% being achieved at temperature from about 300° C. to about 450° C. FIG. 4 provides a series of plots comparing the NO storage efficiency of test samples prepared from sample catalysts A–E after aging. Each of the test samples prepared from sample catalysts A–E showed a marked drop in NO storage efficiency after aging. However, catalyst samples B (catalyst sample A+6% Mn) and D (2% Pt, 10% BaO, 10% MgO, and 6% Mn on alumina) showed higher efficiencies than sample A and E over the temperature range from about 350° C. to about 500° C. Moreover, the test sample prepared from catalyst samples B had an efficiency over 20% in the temperature range from about 360° C. to about 540° C. and the test sample prepared from sample catalyst D had an efficiency over 20% in the temperature range from about 390° C. to about 600° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method of removing harmful gases from an automobile exhaust containing $NO_x$, CO, and hydrocarbons the method comprising:
    contacting a $NO_x$ trap composition with a first exhaust gas mixture at a temperature of at least 200 °C., the first exhaust gas mixture comprising exhaust gases from an internal combustion engine operating in a fuel-lean condition and the $NO_x$ trap composition comprising:
        a precious metal;
        a $NO_x$ absorber material;
        an oxide that inhibits the decrease in $NO_x$ storing ability of the $NO_x$ trap composition, wherein proximity between oxidizing components and trapping components is optimized to maximize spillover; and
        a support material; and
    contacting the $NO_x$ trap composition with a second exhaust gas composition at a temperature of at least 200° C., the second exhaust gas mixture comprising exhaust gases from an internal combustion engine operating in a fuel-rich condition.

2. The method of claim 1 wherein the oxide that inhibits the decrease in $NO_x$ storing ability of the $NO_x$ trap composition is selected from the group consisting of oxides of magnesium, oxides of manganese, and combinations thereof.

3. The method of claim 1 wherein the oxide that inhibits the decrease in $NO_x$ storing ability of the $NO_x$ trap composition is present in an amount from about 1 to 30% of the total weight of the $NO_x$ trap washcoat.

4. The method of claim 1 wherein the oxide that inhibits the decrease in $NO_x$ storing ability of the $NO_x$ trap composition is present in an amount from about 5 to 20% of the total weight of the $NO_x$ trap washcoat.

5. The method of claim 1 wherein the oxide that inhibits the decrease in $NO_x$ storing ability of the $NO_x$ trap composition is present in an amount from about 5 to 15% of the total weight of the $NO_x$ trap washcoat.

6. The method of claim 1 wherein the $NO_x$ absorber is selected from the group consisting of oxides of alkali metals, oxides of alkaline earth metals, oxides of rare earth metals, and combinations thereof.

7. The method of claim 1 wherein the $NO_x$ absorber is selected from the group consisting of cesium oxide, praseodymium oxide, strontium oxide, barium oxide, and combinations thereof.

8. The method of claim 1 wherein the precious metal is a metal selected from the group consisting of platinum, palladium, rhodium, and combinations thereof.

9. The method of claim 1 wherein the $NO_x$ trap composition is applied to a substrate.

10. The method of claim 9 wherein the substrate is cordierite.

11. The method of claim 9 wherein the $NO_x$ trap composition is applied to the substrate by washcoating.

12. A thermally stable $NO_x$ trap composition comprising:
    a support material;
    a $NO_x$ absorber material;
    an oxide selected from the group consisting of oxides of magnesium, oxides of manganese, and combinations thereof in sufficient contact with the $NO_x$ absorber that a $NO_x$ trap incorporating the $NO_x$ trap composition has a $NO_x$ storage efficiency of at least 5% at a temperature of 400° C. after aging of the $NO_x$ trap, wherein proximity between oxidizing components and trapping components is optimized to maximize spillover; and
    a precious metal in contact with the $NO_x$ material.

13. The composition of claim 12 wherein the $NO_x$ absorber is selected from the group consisting of oxides of alkali metals, oxides of alkaline earth metals, oxides of rare earth metals, and combinations thereof.

14. The composition of claim 12 wherein the $NO_x$ absorber is selected from the group consisting of cesium oxide, praseodymium oxide, strontium, barium oxide, and combinations thereof.

15. The composition of claim 12 wherein the precious metal is a metal selected from the group consisting of platinum, palladium, rhodium, and combinations thereof.

16. The composition of claim 12 wherein the oxide is present in an amount from about 1 to 30% of the total weight of the $NO_x$ trap washcoat.

17. The composition of claim 12 applied to a substrate.

18. The composition of claim 17 wherein the substrate is cordierite.

19. A vehicle exhaust system comprising a $NO_x$ trap that includes the composition of claim 12.

20. A method of removing harmful gases from an automobile exhaust containing $NO_x$, CO, and hydrocarbons the method comprising:

contacting a $NO_x$ trap composition with a first exhaust gas mixture at a temperature of at least 200° C., the first exhaust gas mixture comprising exhaust gases from an internal combustion engine operating in a fuel-lean condition and the $NO_x$ trap composition comprising:

a precious metal;

barium oxide;

a oxide that inhibits the decrease in $NO_x$ storing ability of the barium oxide; and a support material, wherein proximity between oxidizing components and trapping components is optimized to maximize spillover; and contacting the $NO_x$ trap composition with a second exhaust gas composition, the second exhaust gas mixture comprising exhaust gases from an internal combustion engine operating in a fuel-rich condition.

* * * * *